United States Patent [19]

Hammond

[11] Patent Number: 4,786,028
[45] Date of Patent: Nov. 22, 1988

[54] FLUID FLOW CONTROL VALVE

[75] Inventor: Brian W. Hammond, Coltishall, United Kingdom

[73] Assignee: Heatrae-Sadia Heating Limited, Norwich, England

[21] Appl. No.: 17,861

[22] Filed: Feb. 24, 1987

[30] Foreign Application Priority Data

Mar. 5, 1986 [GB] United Kingdom ............... 8605436

[51] Int. Cl.⁴ .................... F16K 13/08; F16L 55/14
[52] U.S. Cl. ...................................... 251/7; 126/380; 137/636.1; 251/251
[58] Field of Search ............... 126/380, 419, 421, 427, 126/436; 251/4, 6, 7, 8, 251, 252; 604/249, 250; 137/636, 636.1

[56] References Cited

U.S. PATENT DOCUMENTS

| | | | |
|---|---|---|---|
| 2,167,952 | 8/1939 | Jordan | 251/7 |
| 2,412,397 | 12/1946 | Harper | 251/7 |
| 2,641,437 | 6/1953 | Jay et al. | 251/252 |
| 2,660,395 | 11/1953 | Mair et al. | 251/7 |
| 3,215,394 | 11/1965 | Sherman | 251/4 |
| 3,759,483 | 9/1973 | Boxter | 251/251 |
| 3,831,600 | 8/1974 | Yum et al. | 251/8 |
| 3,906,928 | 9/1975 | Wright | 126/419 |
| 4,257,446 | 3/1981 | Ray | 251/8 |
| 4,287,879 | 9/1981 | Roark | 126/437 |
| 4,303,222 | 12/1981 | Campbell | 251/7 |
| 4,322,054 | 3/1982 | Campbell | 251/7 |
| 4,576,593 | 3/1986 | Mommer | 251/7 |

FOREIGN PATENT DOCUMENTS

| | | | |
|---|---|---|---|
| 605432 | 5/1960 | Italy | 251/7 |
| 192574 | 11/1964 | Sweden | 251/7 |

Primary Examiner—George L. Walton
Attorney, Agent, or Firm—Lee & Smith

[57] ABSTRACT

A fluid flow control valve comprises a valve housing through which passes a deformable tube for receiving a flow of fluid, and means movable within the housing for constricting the tube, said constricting means comprising a valve plunger arranged for sliding movement within a valve housing in the form of a valve block under control of a control cam, and a plunger and valve housing respectively having shaped tube-contacting surfaces between which the tube is compressed by the sliding movement of the plunger.

8 Claims, 3 Drawing Sheets

FLUID FLOW CONTROL VALVE

This invention relates to a fluid flow control valve.

BACKGROUND TO THE INVENTION

Fluid flow control valves are known in which a valve plunger is slidable within a valve hosing, under the control of a rotatable control cam, to compress a deformable tube extending through the housing and which in use passes a flow of fluid. In the prior art, it is known to provide a rotatable cam having a camming surface which is oblique to the axis of rotation of the cam. It is also known to provide the cam with a circumferential surface of varying radius about the axis of rotation. The intention of the differing proposals is to provide better control over the deformation of the tube which provides the valving action. However, the achievement of an efficient valving action still presents problems and it is an object of this invention to provide a construction of fluid flow control valve in which an improved valving action is obtained.

BRIEF SUMMARY OF THE INVENTION

According to one aspect of the present invention, there is provided a fluid flow control valve comprising a valve housing through which passes a deformable tube for receiving a flow of fluid, a valve plunger slideable within the housing to deform and construct the tube, and a cam for causing sliding movement of the plunger towards the tube, the plunger and the valve housing each having respective convex part-cylindrical tube-contacting surfaces, the axes of which are parallel and generally transverse to the direction of extent of the tube at the point of contact, the tube-contacting surfaces being opposed to one another on either side of the tube so that the sliding movement of the plunger towards the tube compresses the tube between the two tube-contacting surfaces, and the cam being mounted for rotation about an axis transverse to the direction of sliding movement of the piston and having a circumferential cam surface of varying radius from the said axis of rotation.

The control valve may comprise a generally cylindrical member with a ramped outer face engaging the valve plunger, for causing progressive sliding movement of the plunger on rotation of the cam. Rotation of the cam is conveniently effected by rotation of an associated control knob, fixed in rotation to the cam, for example by the control knob and control cam being mounted on a common shaft.

The tube preferably comprises silicon rubber hose with laminated plastic monofilament reinforcement and a silicon rubber external sheath. Such a tube is readily deformable yet has good resilience and is found to be hard wearing and have a long life.

The valve block, valve plunger, cam and knob are preferably of rigid plastics material, such as acetal. In use, by constricting the tube the cross sectional area of the tube opening may be varied as required, with the tube opening preferably being completely closeable in the extreme case so that the valve can act to prevent flow altogether as well as permitting variation of the rate of fluid flowing therethrough.

A valve in accordance with the invention finds application in a range of different contexts, such as in domestic appliances, one particular application envisaged being in domestic hot water heaters.

DESCRIPTION OF EMBODIMENT

Figure 1:
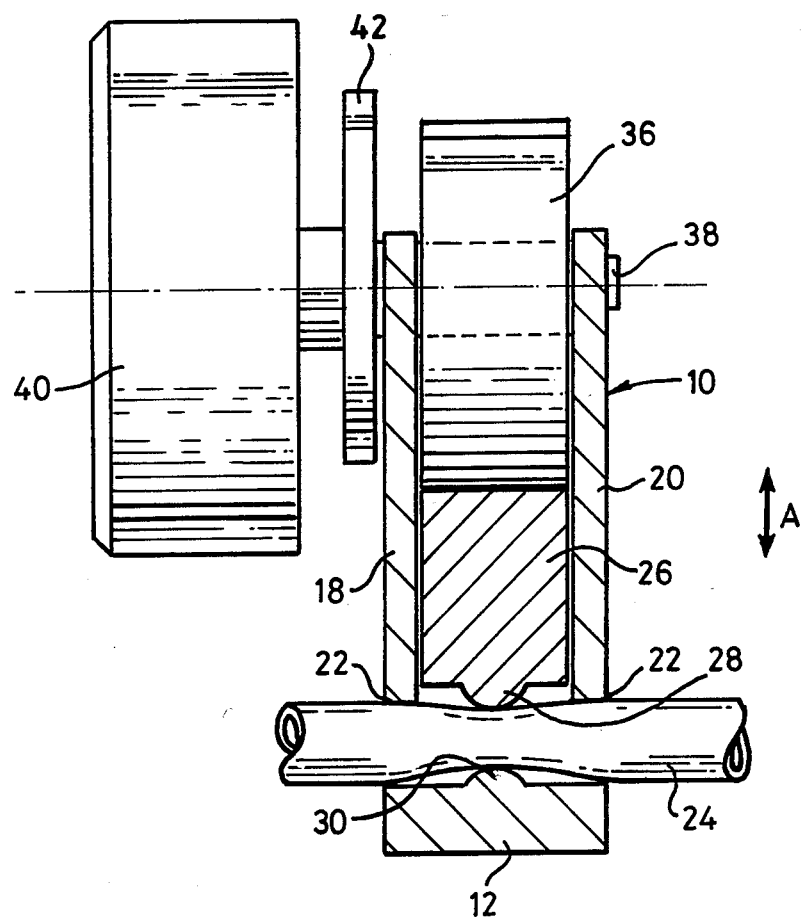
FIG. 1 is a part sectional side view of a valve in accordance with the invention shown in partly closed condition.
Figure 2:
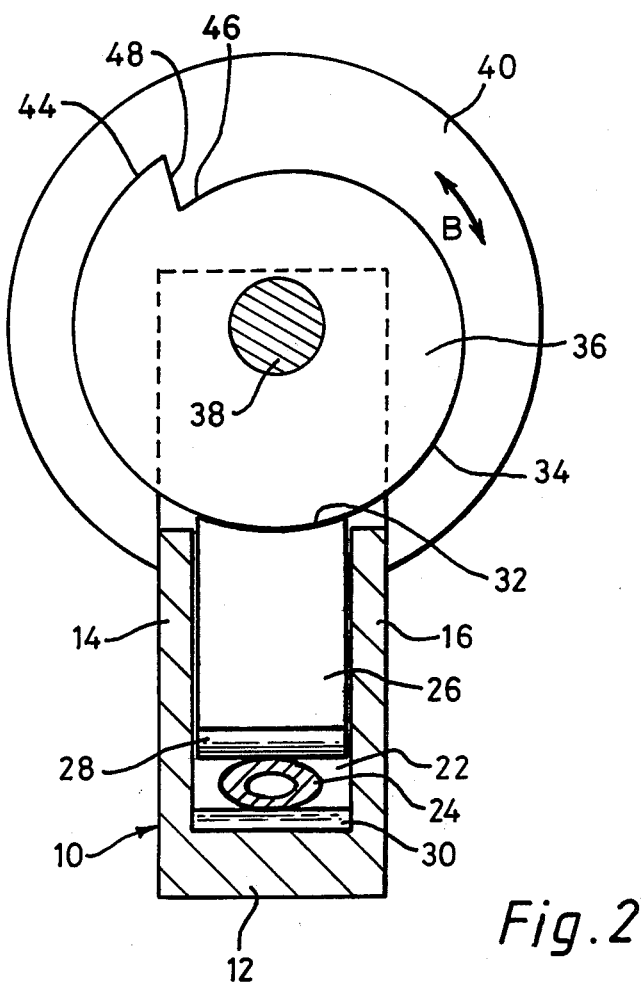
FIG. 2 is a part sectional end view of the valve illustrated in FIG. 1.

The valve illustrated in FIGS. 1 and 2 comprises a valve block 10 comprising a base wall 12, two opposed side walls 14 and 16, and front and rear walls 18 and 20, respectively. Aligned openings 22 are provided in lower regions of the front and rear walls, adjacent the base wall, providing a passage through the valve block through which a tube 24 extends.

A valve plunger 26 is mounted for sliding movement within the valve block 10, as indicated by arrows A. A semi-cylindrical protrusion 28 is provided on the underside of block 26, extending across the width thereof, with a similar semi-cylindrical protrusion 30 upstanding from valve block base wall 12. The two protrusions 28 and 30 are parallel to and aligned with each other for engaging tube 24 therebetween.

Valve plunger 26 has a part cylindrical upper face 32, as illustrated in FIG. 2, which is engaged by the ramped outer face 34 of a generally cylindrical cam 36. Cam 36 is keyed to a shaft 38 passing through apertures in valve block front and rear walls, with an operating knob 40 secured to the outer end of shaft 38. A spacer member 42 is provided on shaft 38 between knob 40 and valve body front wall 18 to reduce lateral play of the knob/cam arrangement.

The configuration of cam 36 is such that rotation of the cam about axis 38, as represented by arrows B in FIG. 2, in response to corresponding rotation of knob 40 results in sliding movement of valve plunger 26 within valve block 10. To this end, cam outer face 34 includes an end region 44 of maximum radius (corresponding to the lowermost position of valve plunger 26 within the valve block 10 and hence corresponding to a fully closed condition of tube 24), and is smoothly inclined towards end region 46 of minimum radius (corresponding to the uppermost position of valve plunger 26 within the valve block 10 and hence to the fully opened condition of tube 24), with regions 44 and 46 being connected by a shoulder 48 constituting a stop.

In use, by rotating knob 40 and hence cam 36 to bring different portions of cam face 34 into contact with the upper face 32 of valve plunger 26, so the position of the valve plunger 26 within the valve block 10 may be smoothly varied with corresponding variation in the amount of compression of tube 24 and hence the rate of fluid flow possible therethrough.

For example, consider as a starting point the valve in fully open condition, with the cam 36 in such a position that region 46 engages plunger face 32 and shoulder 48 engages a side face of the plunger. From this condition anti-clockwise rotation of cam 36 as viewed in FIG. 2 will cause progressive downwards sliding movement of plunger 26 within the valve block 10, causing progressive compression of tube 24 between protrusions 28 and 30, thus progressively reducing the cross-sectional area of the tube opening and so progressively reducing the rate of fluid flow possible therethrough. In the extreme case, when cam region 44 engages plunger face 32, the opening of tube 24 will be fully closed so no flow is possible and the valve is effectively closed. On subsequent opening of the valve by clockwise movement of cam 36 from this position, plunger 26 is moved progressively upwards within valve block 10 as a result of the natural resilience of tube 24 and/or the effect of fluid pressure within tube 24.

In the illustrated embodiment, tube 24 comprises a silicon rubber hose with laminated plastics monofilament reinforcement and a silicon rubber external sheath, and all other components are made of acetal.

Figure 3:
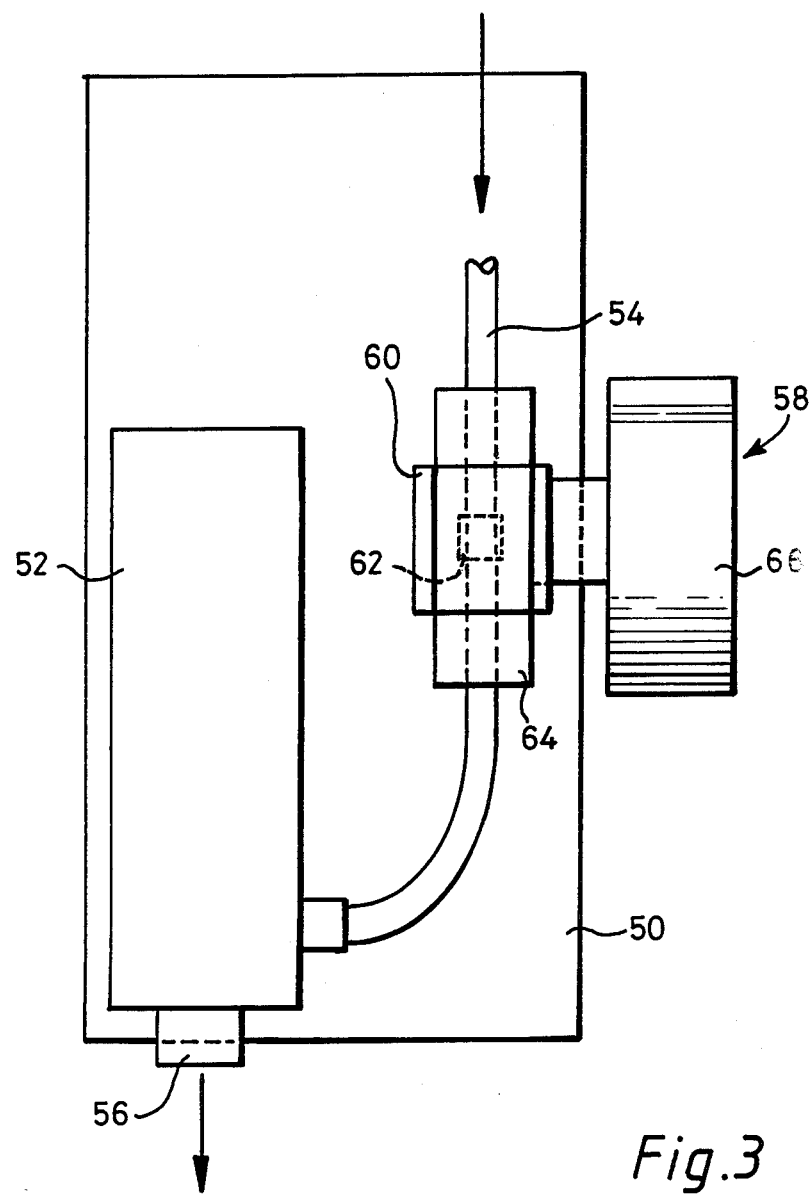
FIG. 3 is a schematic illustration of a valve in accordance with the invention incorporating in a domestic hot water heater.

A typical application of the valve as shown in FIGS. 1 and 2 is in a domestic instantaneous water heater, as illustrated schematically in FIG. 3. The illustrated arrangement comprises a casing 50 housing a heat exchanger 52 to which cold water is supplied via inlet pipe 54 and from which hot water leaves via outlet 56. Inlet pipe 54 is of deformable material, such as described above, and water flow through the heater is controlled by means of a valve arrangement 58 corresponding generally to the valve of FIGS. 1 and 2. The valve arrangement comprises a valve block or body 60 and valve plunger 62 between which pipe 54 passes, and a cam 64 controlled by knob 66 located outside casing 50. The main difference between this valve arrangement and that of FIGS. 1 and 2 is that in FIG. 3 the path of pipe 54 is perpendicular to the axis of the knob/cam arrangement rather than being parallel thereto as in FIGS. 1 and 2. The valve block 60 is modified by having pipe receiving openings in its side walls, rather than its front and rear walls. In addition, the valve plunger and valve block base are provided with part-cylindrical protrusion extending parallel to the knob/cam axis rather than perpendicular thereto. Otherwise, the valve arrangement is generally similar to that of FIGS. 1 and 2 and functions in exactly the same away to vary or stop water flow through the heater.

It will be appreciated that the detailed design of the valve may be varied. For example, a stop may be provided on the cam 36 to prevent movement beyond the fully closed condition in addition to the stop constituted by shoulder 48 for preventing movement beyond the fully opened condition.

I claim:

1. A fluid flow control valve comprising
a valve housing,
a deformable tube passing through the valve housing and for receiving a flow of fluid,
a valve plunger slidably mounted within the housing, and
a cam operable for causing sliding movement of the plunger to deform and constrict the tube, wherein the plunger and the valve housing each have respective convex part-cylindrical tube-contracting surfaces, the axes of which are parallel and generally transverse to the direction of extent of the tube at the point of contact, the tube-contacting surfaces being opposed to one another on either side of the tube so that the sliding movement of the plunger towards the tube compresses the tube between the two tube-contracting surfaces,
the cam is mounted for rotation about an axis transverse to the direction of sliding movement of the piston and having a circumferential cam surface of varying radius from the said axis of rotation, and
the plunger has a part cylindrical upper face and the control cam comprises a generally cylindrical member mounted for rotation about an axis transverse to the direction of sliding movement of the plunger and having a peripheral face ramped over a peripheral arc of substantially 360 degrees with an end region of minimum radius about said axis of rotation arcuately adjacent an end region of maximum radius about said rotation axis, the two said end regions being separated by a step which constitutes a rotation-limiting stop, and said ramped peripheral face directly engaging the part-cylindrical upper face of the plunger to cause progressive sliding movement of the plunger on rotation of the cam, thereby progressively to compress the tube from a fully open condition to a fully closed condition when said cam has been rotated through substantially 360 degrees and from a fully closed condition to a fully open condition when said cam has been rotated through substantially 360 degrees in an opposite direction to an orientation where the step engages one side of the plunger.

2. A valve according to claim 1, wherein the control cam comprises a generally cylindrical member with a raped outer face engaging the valve plunger, for causing progressive sliding movement of the plunger on rotation of the cam.

3. A valve according to claim 2, further comprising a control knob fixed in rotation to the cam, for causing rotation of the cam.

4. A valve according to claim 3, wherein the control knob and control cam are mounted on a common shaft.

5. A valve according to claim 1, wherein the tube comprises a silicon rubber hose with laminated plastics monofilament reinforcement and a silicon rubber external sheath.

6. A valve according to claim 5, wherein the component(s) other than the tube is(are) of rigid plastics material.

7. A valve according to claim 1, wherein the tube opening is completely closeable so that the valve can act to prevent flow altogether as well as permitting variation of the rate of fluid flowing therethrough.

8. A domestic hot water heater incorporating a valve in accordance with claim 1.

* * * * *